United States Patent
Yasuda et al.

(10) Patent No.: US 7,050,901 B2
(45) Date of Patent: May 23, 2006

(54) FUEL PROPERTY DETERMINATION SYSTEM

(75) Inventors: Hajime Yasuda, Tokyo (JP); Masaaki Ashida, Yokohama (JP); Kouichi Mori, Kanagawa (JP); Shunichi Mitsuishi, Kanagawa (JP); Yoshinao Ugomori, West Bloomfield, MI (US)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/942,906

(22) Filed: Sep. 17, 2004

(65) Prior Publication Data

US 2005/0065710 A1    Mar. 24, 2005

(30) Foreign Application Priority Data

| Sep. 19, 2003 | (JP) | ............................ 2003-326990 |
| Sep. 19, 2003 | (JP) | ............................ 2003-326991 |
| Sep. 19, 2003 | (JP) | ............................ 2003-326992 |
| Sep. 22, 2003 | (JP) | ............................ 2003-329357 |

(51) Int. Cl.
  *F02D 19/06* (2006.01)

(52) U.S. Cl. ...................... 701/113; 701/114; 73/35.02; 73/116

(58) Field of Classification Search ................. None
See application file for complete search history.

(56) References Cited

U.S. PATENT DOCUMENTS

| 4,920,494 | A |   | 4/1990 | Abo et al. |
| 5,711,272 | A |   | 1/1998 | Maegawa et al. |
| 5,817,923 | A | * | 10/1998 | Ohsaki et al. ............. 73/35.02 |
| 6,079,396 | A | * | 6/2000 | Ament et al. ............... 123/674 |
| 6,318,152 | B1 |  | 11/2001 | Hagihara et al. |

FOREIGN PATENT DOCUMENTS

| JP | 2-308945 A | 12/1990 |
| JP | 3-233151 A | 10/1991 |
| JP | 9-151777 A | 6/1997 |

* cited by examiner

*Primary Examiner*—Andrew M. Dolinar
(74) *Attorney, Agent, or Firm*—Foley & Lardner LLP

(57) ABSTRACT

A fuel property determination system for an internal combustion engine is arranged to determine a fuel property indicative that fuel in use is heavy or light, on the basis of a degree of change of a revolution speed during a period from an expansion stroke of a first fuel injection cylinder at engine start to an expansion stroke of a final fuel injection cylinder in a first round as to all cylinders of the engine.

29 Claims, 13 Drawing Sheets

FUEL PROPERTY DETERMINATION SYSTEM

BACKGROUND OF THE INVENTION

The present invention relates a system for determining a fuel property (heavy/light property) of fuel used in an internal combustion engine.

Japanese Published Patent Application No. 9-151777 discloses a method of determining a fuel property (heavy/light property) of fuel in use by detecting a revolution speed difference per each predetermined cycle such as a ½ engine revolution after a cranking speed reaches a predetermined cranking speed such as a cranking speed of 300 rpm, and by determining whether or not the number of the elapsed cycles is greater than or equal to a predetermined value when the sum of the revolution speed differences becomes greater than or equal to a predetermined value.

SUMMARY OF THE INVENTION

However, in case that the fuel property is determined after a predetermined time elapses from a first engine combustion, the feedback of the fuel property determination delays and there is a possibility that the determination accuracy degrades.

It is therefore an object of the present invention to provide a fuel property determination system for an internal combustion engine which system is capable of accurately determining a fuel property in quick response to engine start.

An aspect of the present invention resides in a fuel property determination system which is for an internal combustion engine and which comprises a control unit configured to determine a fuel property indicative that fuel in use is heavy or light, on the basis of a degree of change of a revolution speed during a period from an expansion stroke of a first fuel injection cylinder at engine start to an expansion stroke of a final fuel injection cylinder in a first round as to all cylinders of the engine.

Another aspect of the present invention resides in a method of determining a fuel property of fuel in use for an internal combustion engine. The method comprises an operation of determining a fuel property indicative that fuel in use is heavy or light, on the basis of a degree of change of a revolution speed during a period from an expansion stroke of a first fuel injection cylinder at engine start to an expansion stroke of a final fuel injection cylinder in a first round as to all cylinders of the engine.

A further aspect of the present invention resides in a fuel property determination system which is for an internal combustion engine and which comprises a control unit configured to detect a degree of change of a revolution speed during a period comprising a predetermined stroke of a cylinder being involved with a first fuel injection thereto, and to determine a fuel property being indicative of a specific gravity of fuel in use on the basis of the degree of change of the revolution speed.

The other objects and features of this invention will become understood from the following description with reference to the accompanying drawings.

DETAILED DESCRIPTION OF THE INVENTION

There are discussed preferred embodiments of a fuel property determination system according to the present invention with reference to the drawings.

Referring to FIGS. 1 through 6, there is discussed a first embodiment of the fuel property determination system according to the present invention.

Figure 1:
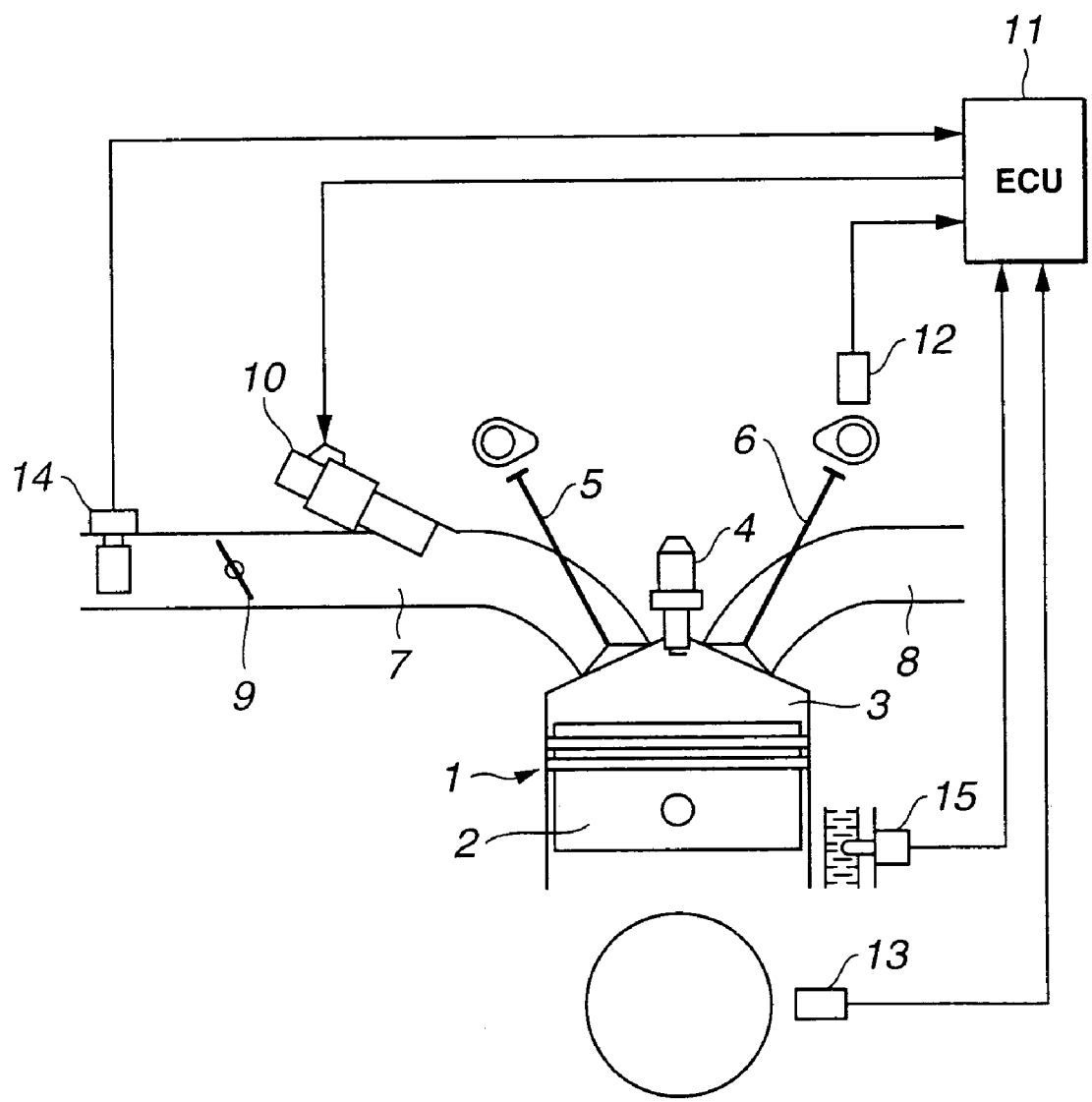
FIG. 1 is a schematic view showing an engine system which comprises a fuel property determination system according to a first embodiment of the present invention.

As shown in FIG. 1, the fuel property determination system according to the present invention is applied to an engine system. An internal combustion engine 1 of the engine system comprises a plurality of combustion chambers 3 each of which is defined by each cylinder and each piston 2. A spark plug 4, an intake valve 5 and an exhaust valve 6 are provided at upper portions of combustion chamber 3 so as to surround combustion chamber 3. An intake passage 7 and an exhaust passage 8 are also connected with combustion chamber 3.

A throttle valve 9 is provided upstream of an intake manifold of intake passage 7. A fuel injector 10 of an electromagnetic type is installed at each branch portion of the intake manifold by each cylinder so as to inject fuel toward intake valve 5.

An engine control unit (ECU) 11 controls the operation of each fuel injector 10. ECU 11 is connected with a cam angle sensor 12, a crank angle sensor 13, an airflow meter 14, and a water temperature sensor 15 to receive signals therefrom. Cam angle sensor 12 detects a cam angle indicative signal employed for a cylinder determination. Crank angle sensor 13 outputs a crank angle signal synchronized with the engine revolution and is capable of determining an engine speed Ne of engine 1. Airflow meter 14 is disposed upstream of throttle valve 9 in intake passage 7 and detects an intake air quantity Qa. Water temperature sensor 15 detects a temperature Tw of engine cooling water.

For the control of fuel injection of fuel injector 10, ECU 11 calculates a basic fuel injection quantity Tp=K·Qa/Ne on the basis of intake air quantity Qa and engine speed Ne, determines a final fuel injection quantity Ti=Tp·COEF where COEF is a correction coefficient by properly correcting basis fuel injection quantity Tp, and outputs a drive pulse signal corresponding to final fuel injection quantity Ti at a timing in synchronization with the engine revolution to fuel injector 10 of each cylinder, wherein correction coefficient COEF includes an increase quantity correction coefficient (hereinafter referred to as start increase quantity correction quantity) KAS for increasing a fuel quantity during an engine start and thereafter, as shown by the following expression (1).

$$COEF=1+KAS+\ldots \quad (1)$$

Start increase quantity correction coefficient KAS is calculated from the following expression (2).

$$KAS=MTKAS \times TMKAS \quad (2)$$

where MTKAS is a table value (water temperature increase rate) according to engine cooling water temperature Tw, and therefore MTKAS takes a large value when engine cooling water temperature Tw is low and decreases as engine cooling water temperature Tw rises.

Figure 2:
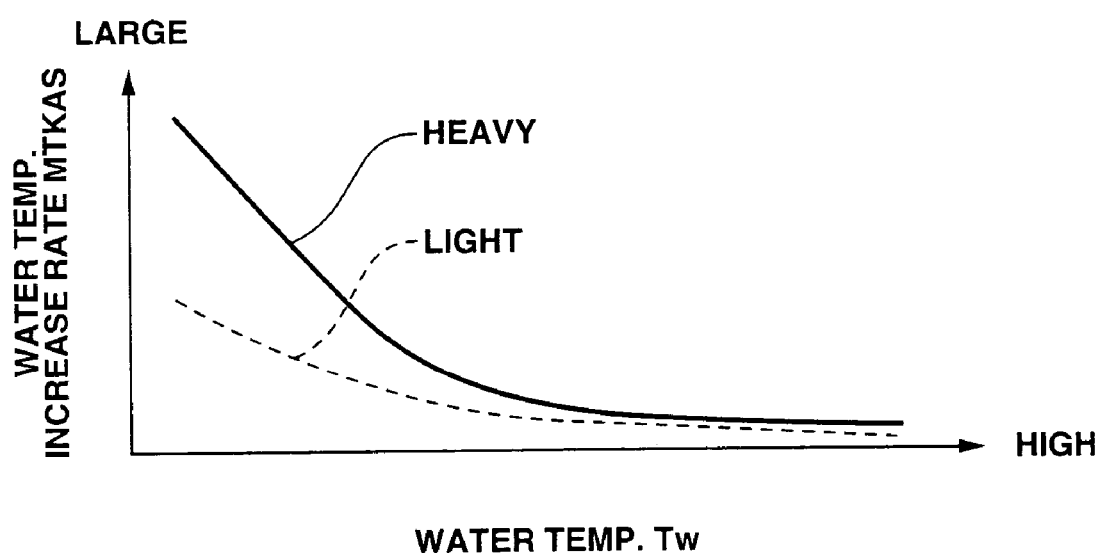
FIG. 2 is a graph showing a relationship of a water temperature increase rate of fuel and an engine cooling water temperature in accordance with a fuel property.

This table value is changed according to the fuel property, that is, according to whether fuel in use is heavy fuel or light fuel. FIG. 2 is a schematic graph showing tables of water temperature increase rate (MTKAS). A difference of fuel vaporization rate between heavy and light fuels is large when cooling water temperature Tw is low, and is decreased as cooling water temperature Tw rises. Therefore, increase quantity rate MTKAS is set according to the kind of fuel as shown in FIG. 2.

TMKAS is a table value (time correction coefficient) determined according to the elapsed time from the engine start and is decreased as the time elapses from the engine start.

In the first embodiment according to the present invention, ECU 11 executes a control program for achieving the fuel property determining process of the fuel property determining system. Hereinafter, there will be discussed a flowchart of a fuel property determination routine shown in FIG. 3. In the first embodiment, engine 1 is a four-cylinder engine.

At step S10 ECU 11 determines a first fuel injection cylinder of four-cylinder engine 1. More specifically, for the by-cylinder fuel injection control, ECU 11 determines the cylinder of executing the fuel injection. Bases on this cylinder determination, ECU 11 determines which stoke of intake, compression, expansion and exhaust strokes is being executed at each of the four cylinders.

Since the fuel injection is executed on the basis of the cylinder determination result, ECU 11 determines the first fuel injection cylinder at which the fuel injection is firstly executed and the expansion stroke is firstly executed. Normally, the fuel injection is executed during the exhaust stroke of each corresponding cylinder. However, in order to further rapidly start engine 1, at the first fuel injection cylinder the fuel injection is executed during the intake stroke. Therefore, the fuel injection at the first fuel injection cylinder and the fuel injection at the second fuel injection cylinder are simultaneously executed.

When the first fuel injection cylinder, at which the fuel injection is firstly executed and the expansion stroke is firstly executed, is determined, ECU 11 sets a value Nc indicative of the number of cylinders from the first fuel injection cylinder at 1 (Nc=1), and the routine proceeds to step S20.

At step S20 ECU 11 detects an angular speed $\omega 1$ (deg/s) at a compression-stroke top dead center (TDC) of the first fuel injection cylinder (Nc=1). More specifically, ECU 11 detects angular speed $\omega$ at TDC and set the detected angular speed $\omega$ as TDC angular speed $\omega 1$.

At step S30 ECU 11 detects a maximum angular speed $\omega 2$ during the expansion stroke of the first fuel injection cylinder (Nc=1). More specifically, ECU 11 executes a subroutine shown in FIG. 4 which is executed after angular speed $\omega 1$ at TDC is detected.

Figure 4:
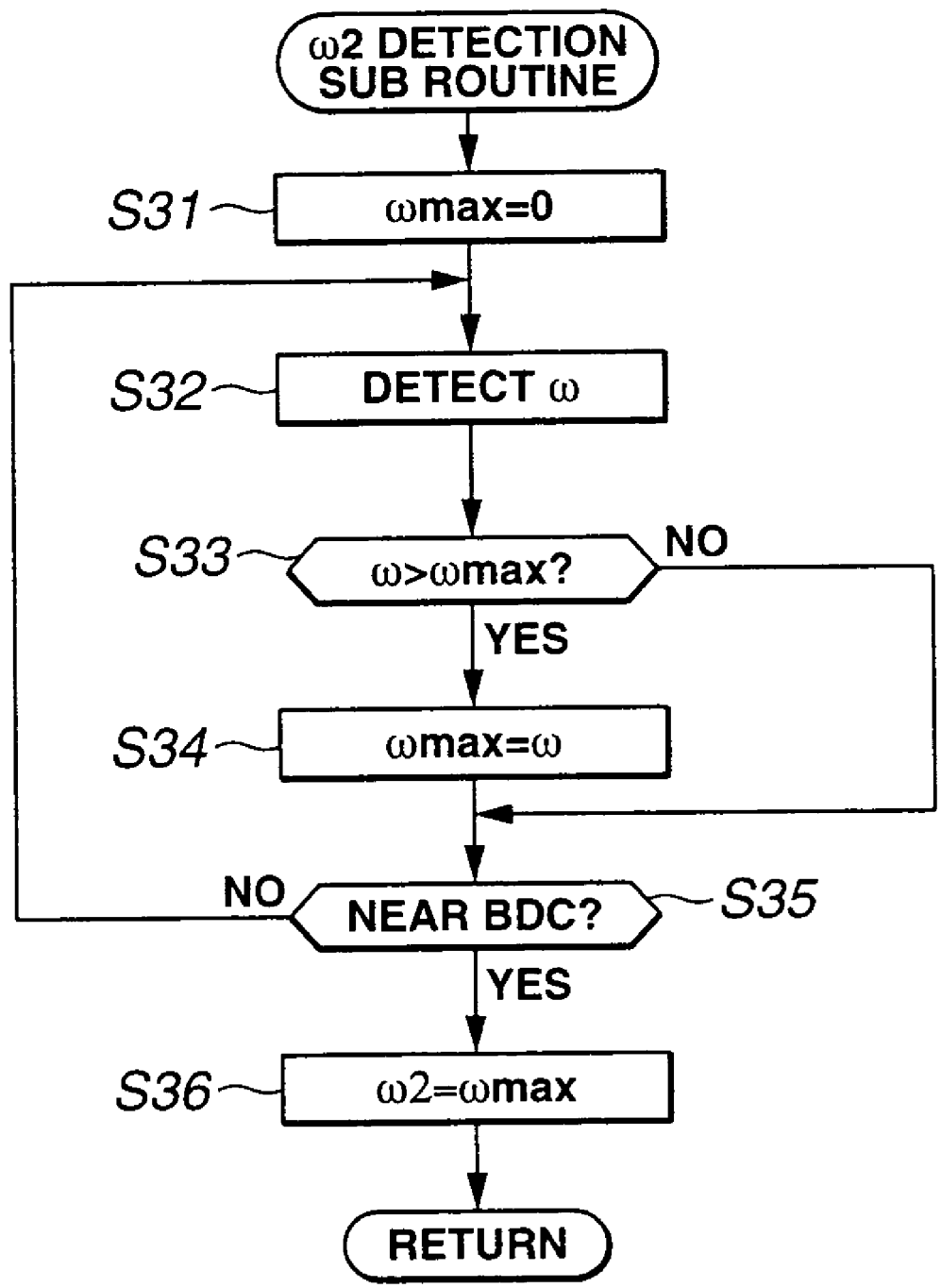
FIG. 4 is a flowchart showing a subroutine of detecting an expansion stroke maximum angular speed.

At step S31 of the subroutine shown in FIG. 4, ECU 11 initializes an angular speed $\omega max$ at compression-stroke TDC ($\omega max=0$). At step S32 ECU 11 detects angular speed $\omega$ at sampling intervals of 10° crank angle. At step S33 ECU 11 compares the detected angular speed $\omega$ with maximum angular speed $\omega max$. When $\omega > \omega max$ at step S33, the subroutine proceeds to step S34 wherein ECU 11 updates maximum angular speed $\omega max$ by setting the detected angular speed $\omega$ at maximum angular speed $\omega max$ ($\omega max=\omega$). When $\omega \leq \omega max$ at step S33, the subroutine jumps to step S35. At step S35 subsequent to the execution of step S34 or the negative determination at step S33, ECU 11 determines whether or not the crank angle of the first fuel injection cylinder reaches near a bottom dead center (BDC) at which the expansion stroke is terminated. When the determination at step S35 is negative, that is, when the crank angle does not reach near BDC, the subroutine returns to step S32 to repeating execute the sampling of the crank angle. When the determination at step 35 is affirmative, that is, when the crank angle of the first fuel injection cylinder reaches near BDC, the subroutine proceeds to step S36 wherein ECU 11 sets maximum angular speed $\omega max$ at this moment as an expansion stroke maximum angular speed $\omega 2$. Thereafter, the program returns to the main routine.

The subroutine for detecting expansion stroke maximum angular speed $\omega 2$ may be arranged to detect an angular speed near an intermediate position of the expansion stroke as a maximum angular speed neighborhood value, or to detect an angular speed near BDC during the expansion stroke in addition to the detection of the maximum angular speed during the expansion stroke.

At step S40 ECU 11 calculates an angular acceleration $\Delta\omega=\omega 2 - \omega 1$ from compression-stroke TDC angular speed $\omega 1$ and expansion stroke maximum angular speed $\omega 2$. Further, ECU 11 may calculate the angular acceleration by employing the expression of $\Delta\omega=(\omega 2-\omega 1)/dt$ where dt is a period from the detection of $\omega 1$ to the detection of $\omega 2$.

At step S50 ECU 11 executes the first combustion determination. More specifically, ECU 11 determines whether or not the first combustion is executed, on the basis of a comparison between angular acceleration $\Delta\omega$ indicative of a changing degree of a revolution speed of each cylinder and a predetermined threshold $\Delta\omega S$ such as 40,000 deg/s². When $\Delta\omega \geq \Delta\omega S$, ECU 11 determines that the first combustion was executed. When $\Delta\omega < \Delta\omega S$, the program proceeds to step S60.

At step S60 ECU 11 determines whether or not Nc=4 is satisfied, that is, ECU 11 determines whether or not the fourth cylinder was checked. When the determination at step S60 is negative, the program proceeds to step S70 wherein Nc is incremented by 1 (Nc=Nc+1).

Thereafter, the processing of steps S20 through S40 is executed to determine the first combustion of the next cylinder corresponding to Nc. More specifically, at step S50 ECU 11 executes the first combustion of the next cylinder on the basis of angular acceleration $\Delta\omega$ obtained from compression TDC angular speed $\omega 1$ and expansion stroke maximum angular speed $\Delta\omega 2$.

When the negative determination indicative that there is no combustion in any cylinder is made at step S50 even though the first combustion determination is repeated from Nc=1 to Nc=4, that is, when no combustion has been executed within a first round wherein the combustion checks as to all cylinders were executed, ECU 11 determines that it is impossible to determine the property (heavy or light property) of fuel. Therefore, the present routine is terminated.

When the affirmative determination is made at step S50 within the first round from Nc=1 to Nc=4, the program proceeds to step S80.

At step S80 ECU 11 determines whether or not $\Delta\omega \geq \Delta\omega L$, by comparing angular acceleration $\Delta\omega$ and a predetermined threshold $\Delta\omega S$ such as 100,000 deg/s$^2$. When the determination at step S80 is negative ($\Delta\omega < \Delta\omega L$), the program proceeds to step S90.

At step S90 ECU 11 determines whether or not Nc=4 is satisfied, that is, ECU 11 determines whether or not the fourth cylinder is checked. When the determination at step S90 is negative, the program proceeds to step S100 wherein Nc is incremented by 1 (Nc=Nc+1).

At step S110 subsequent to the execution of step S100, ECU 11 detects compression-stroke TDC angular speed $\omega 1$ (deg/s). At step S120 ECU detects expansion stroke maximum angular speed $\omega 2$ during the expansion stroke. At step S130 ECU 11 calculates angular acceleration $\Delta\omega = \omega 2 - \omega 1$ from compression-stroke TDC angular speed $\omega 1$ and expansion stroke maximum angular speed $\omega 2$. Thereafter, the program returns to step S80. That is, the processing of step S90 through S130 is repeated until the affirmative determination is made at step S80.

When the affirmative determination is made at step S80 ($\Delta\omega \geq \Delta\omega L$), the program proceeds to step S140 wherein ECU 11 determines that the fuel in use is light fuel. Thereafter, the present program terminated.

In contrast to this, when the affirmative determination is made at step S90 (Nc=4) subsequent to the negative determination at step S80, the program proceeds to step S150 wherein ECU 11 determines that the fuel in use is heavy fuel. Thereafter, the present program is terminated.

Figures 5A, 5B:
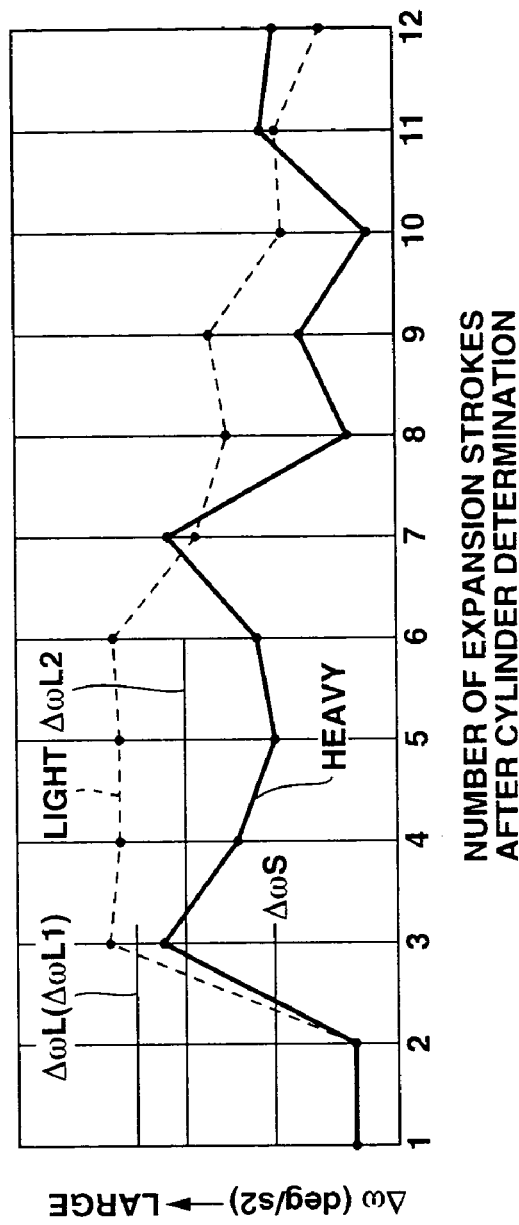
FIG. 5A is a graph showing a change of an angular speed relative to the number of expansion strokes after the cylinder determination.
FIG. 5B is a graph showing a change of an angular acceleration relative to the number of expansion strokes after the cylinder determination.

FIG. 5A is an example showing changes of angular speeds $\omega$ (deg/s) relative to a crank angle from the start of the second time expansion stroke to the end of the sixth time expansion stroke. In the graph of FIG. 5A, an X-axis represents a crank angle and a Y-axis represents angular speed $\omega$.

FIG. 5B shows angular acceleration $\Delta\omega$ of each cylinder, which acceleration is derived from the change of angular speed $\omega$ in FIG. 5A. In a graph of FIG. 5B, an X-axis represents the number of times the expansion stroke was executed, which corresponds to the X-axis of FIG. 5a, and a Y-axis represents angular acceleration $\Delta\omega$.

In FIGS. 5A and 5B, continuous lines denote heavy fuel, and dotted lines denote light fuel.

In this example shown in FIGS. 5A and 5B, the first fuel injection cylinder is a cylinder wherein the number of times of the expansion strokes is three. Even when any fuel (heavy or light fuels) is used, ECU 11 determines the first combustion determination by executing the determination at the first fuel injection cylinder (the number of expansion strokes is three) on the basis of angular acceleration $\Delta\omega = (\omega 2 - \omega 1)/dt$ obtained from compression-stroke TDC angular speed $\omega 1$ and expansion stroke maximum angular speed $\omega 2$. When light fuel is used, $\Delta\omega \geq \Delta\omega L$ is satisfied in simultaneously with the first combustion determination, and therefore ECU 11 determines that the fuel in use is light fuel. When heavy fuel is used, $\Delta\omega \geq \Delta\omega L$ is not satisfied within the first round, that is, within a period that the number of expansion strokes is three to six, and therefore ECU 11 determines that the fuel in use is heavy fuel.

Figure 6:
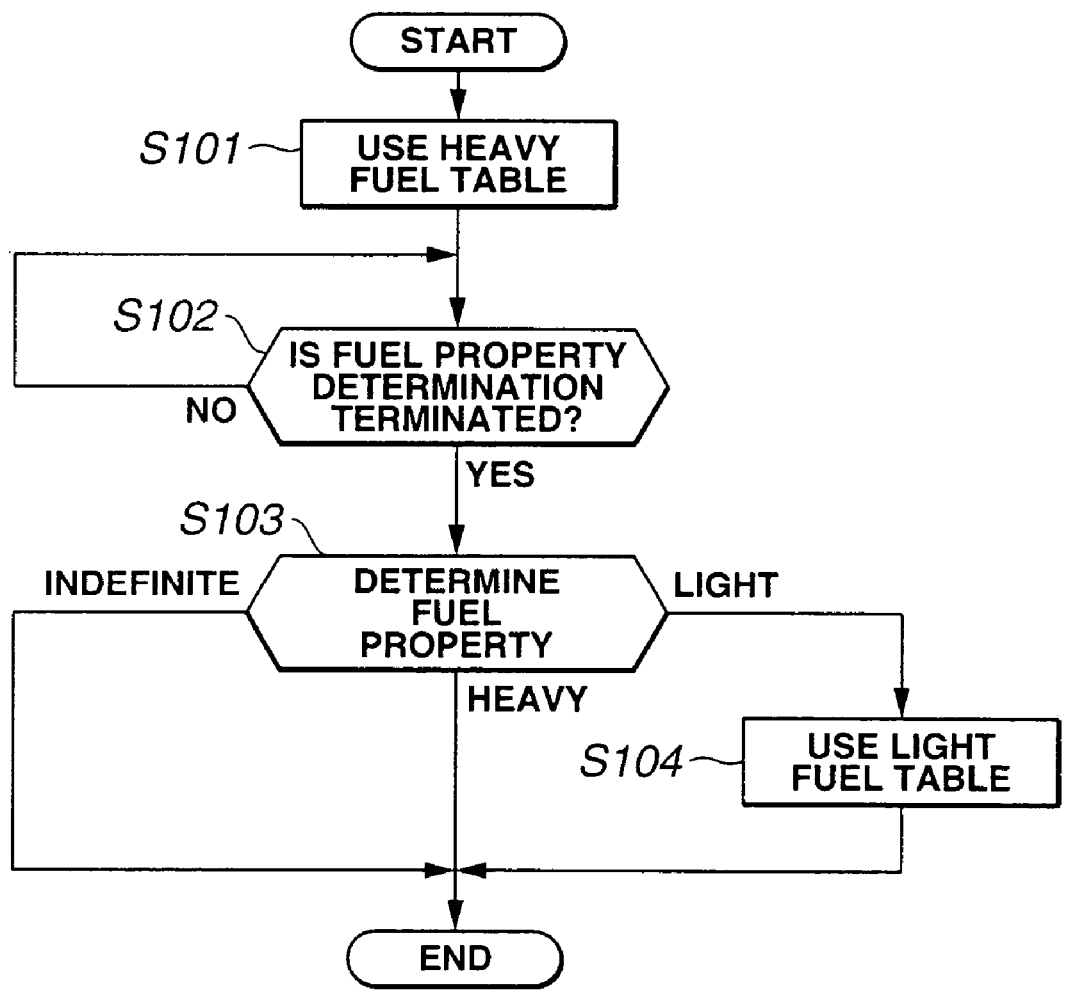
FIG. 6 is a flowchart showing a routine of setting a fuel property (light or heavy property) for the fuel injection quantity control.

FIG. 6 is a flowchart showing a fuel injection quantity control fuel property setting routine for executing a heavy fuel setting or light fuel setting for the fuel injection quantity control, using the fuel property determination according to the present invention. This routine starts in response to the turning on of an engine switch.

At step S101 ECU 11 executes a heavy fuel setting as an initial setting. That is, ECU 11 firstly uses a heavy fuel table shown in FIG. 2 where both of heavy and light fuel tables are shown. If the light fuel setting is firstly executed under a condition that heavy fuel is actually used, the engine starting performance degrades. Therefore, the heavy fuel setting is firstly executed.

At step S102 ECU 11 determines whether or not the heavy fuel determination is terminated. Until the affirmative determination is made at step S102, step S102 is repeated. When the affirmative determination is made at step S102, the program proceeds to step S103.

At step S103 ECU 11 determines whether the fuel in use is heavy fuel, light fuel or indefinite. When ECU 11 determines that the fuel in use is heavy fuel, this routine is terminated since it is not necessary to change the initial setting as to the fuel property. When ECU 11 determines that the fuel in use is light fuel, the routine proceeds to step S104 wherein ECU 11 changes the fuel property setting so as to use the light fuel table shown in FIG. 2. By this changing of the fuel property to the light fuel setting, the fuel consumption of engine 1 is improved.

Figure 3:
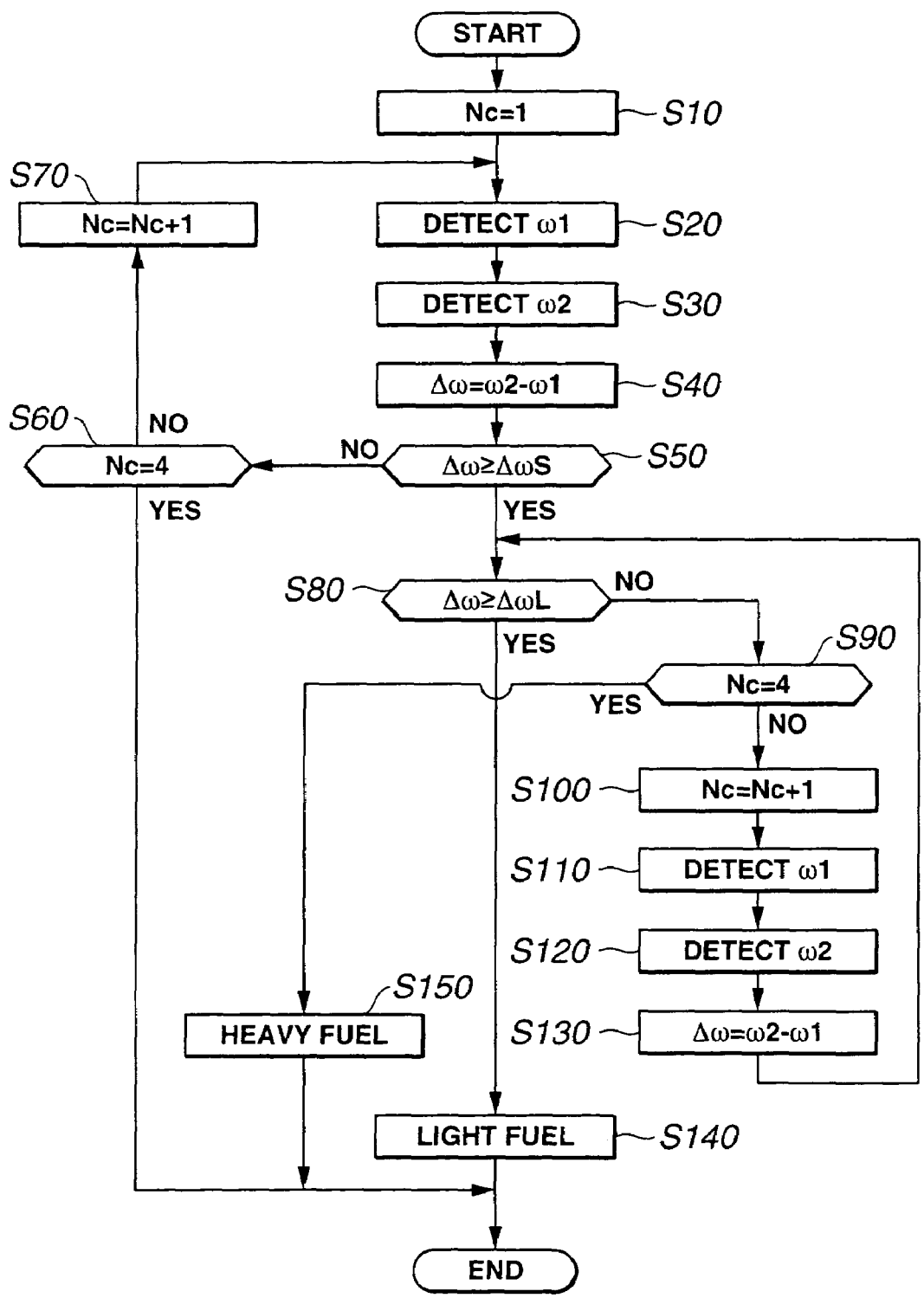
FIG. 3 is a flowchart showing a fuel property determination routine of the first embodiment.

When the fuel property is indefinite, that is, when the program shown in FIG. 3 was terminated after the affirmative determination at step S6 was made, the initial fuel property set at the heavy fuel property is maintained to mainly satisfy the engine starting performance and the engine combustion stability during the engine operation.

With the thus arranged first embodiment according to the present invention, taking account of a fact that the fuel injected during the first round from the first fuel injection cylinder for starting the engine is mainly attached to a wall of an intake port and remained as wall fuel since the intake port was dry, the mass of wall fuel increases as the fuel in use becomes heavier in property. Therefore, a fuel quantity supplied into each cylinder varies according to the fuel property of heavy or light. This variation due to the fuel property (heavy or light) generates the variation (large difference) of the degrees of changes of revolution speeds between heavy fuel and light fuel. Accordingly, on the basis of the degree of change of revolution speed (engine speed) during a period from an expansion stroke of the first fuel injection cylinder to the expansion stroke of the final (fourth) fuel injection cylinder in the first round, ECU 11 determines the fuel property (heavy or light) of fuel in use. This enables an accurate determination as to the fuel property (heavy or light) of the fuel in use within an extremely short time from an engine start until the termination of the first round of the fourth fuel injection cylinder.

Further, with the thus arranged first embodiment according to the present invention, by calculating the degree of change of the engine revolution speed such as an angular acceleration, on the basis of the difference ($\omega 2-\omega 1$) between an expansion stroke start (TDC neighborhood) angular speed $\omega 1$ and an expansion stroke maximum angular speed (or neighborhood value thereof) $\omega 2$, it becomes possible to accurately detect the degree of change of revolution speed. Further, by using an angular speed at a point near the intermediate position during the expansion stroke or an angular speed at a position near BDC during the expansion stroke as a neighborhood value of the maximum angular acceleration during the expansion stroke, it becomes possible to easily detect the degree of change of the angular speed. Particularly, by using the angular speed at a point near the intermediate position during the expansion stroke, it becomes possible to further accurately detect the degree of change of the revolution speed since the difference between the absolute value of the expansion stroke start angular speed $\omega 1$ and the absolute value of the angular speed $\omega 2$. Further, by using the angular speed at a position near the BDC during the expansion stroke, it becomes possible to stably detect the work load during the expansion stroke.

Furthermore, with the first embodiment according to the present invention, by determining the fuel property (heavy or light) through the comparison of the degree of the change of revolution speed with a predetermined threshold $\Delta \omega 1$, the determination of the fuel property is easily executed. Further the determination of the fuel property is further accurately executed by repeating the comparison of the degree of change of the revolution speed of each cylinder with the threshold.

Furthermore, with the first embodiment according to the present invention, when the degree $\Delta \omega$ of change of the revolution speed of either cylinder within the first round becomes higher than or equal to the threshold value $\Delta \omega S$, it is determined that the fuel in use is light fuel. This enables the fuel property determination to be easily executed. Further, when the degree $\Delta \omega$ of change of the revolution speed of either cylinder within the first round does not become higher than or equal to the threshold value $\Delta \omega S$, it is determines that the fuel in use is heavy fuel. This enables the fuel property determination to be accurately executed.

When the first combustion determination was not made within the first round for all cylinders, it is determined that the property of fuel in use cannot be determined, that is, ECU 11 prohibits the fuel property determination based on the degree of change of the revolution speed. This arrangement prevents misjudgment.

Further, with the first embodiment according to the present invention, the first combustion determination is executed on the basis of the comparison between the degree of change of the revolution speed $\Delta \omega S$. Therefore, the first combustion determination is executed using the parameters as same as those of the fuel property determination.

Figure 7:
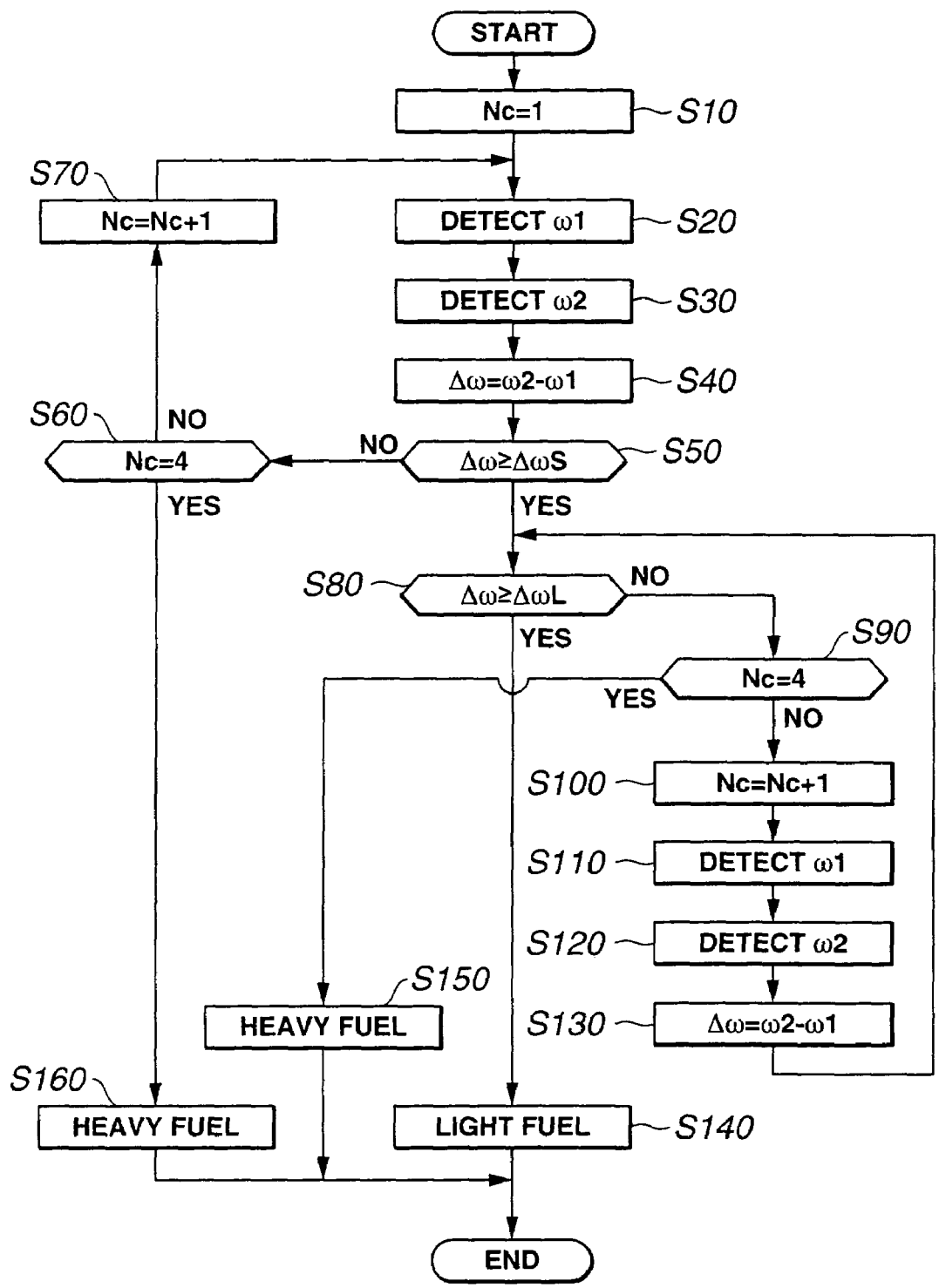
FIG. 7 is a flowchart showing the fuel property determination routine of a second embodiment according to the present invention.

Referring to FIG. 7, there is discussed a second embodiment of the fuel property determination system according to the present invention.

The construction of the second embodiment is basically the same as that of the first embodiment. The is second embodiment employs a flowchart for the fuel property determination routine shown in FIG. 7. The flowchart of FIG. 7 is different from that of FIG. 3 in further comprising step S160 subsequent to the affirmative determination at step S60.

Accordingly, when the negative determination indicative that there is no combustion in any cylinder is made at step S50 even though the first combustion determination is repeated from Nc=1 to Nc=4, that is, when no combustion has been executed within the first round wherein the combustion check as to all cylinders were executed, ECU 11 determines that the fuel in use is heavy fuel.

In the second embodiment according to the present invention, when it is impossible to determine the property (heavy or light property) of fuel from the degree of change of the revolution speed by each cylinder, it is considered that the reason of generating no first combustion in the first round is that the fuel vaporization rate is low. Therefore, in the second embodiment, it is determined that the fuel in use is heavy fuel at step S160 when the affirmative determination is made at step S60. However, even if the affirmative determination is made at step S60 in FIG. 3 of the first embodiment, the fuel property table for heavy fuel is used. Therefore, the actual control based on the flowchart of FIG. 7 in the second embodiment is the same as that executed in the first embodiment.

Although the first and second embodiments have been shown and described such that it is determined whether the fuel in use is heavy fuel or light fuel by comparing the degree of change of the revolution speed with the predetermined threshold $\Delta \omega L$, the degree of the fuel property may be determined according to the level of the degree of change of the revolution speed.

Figure 8:
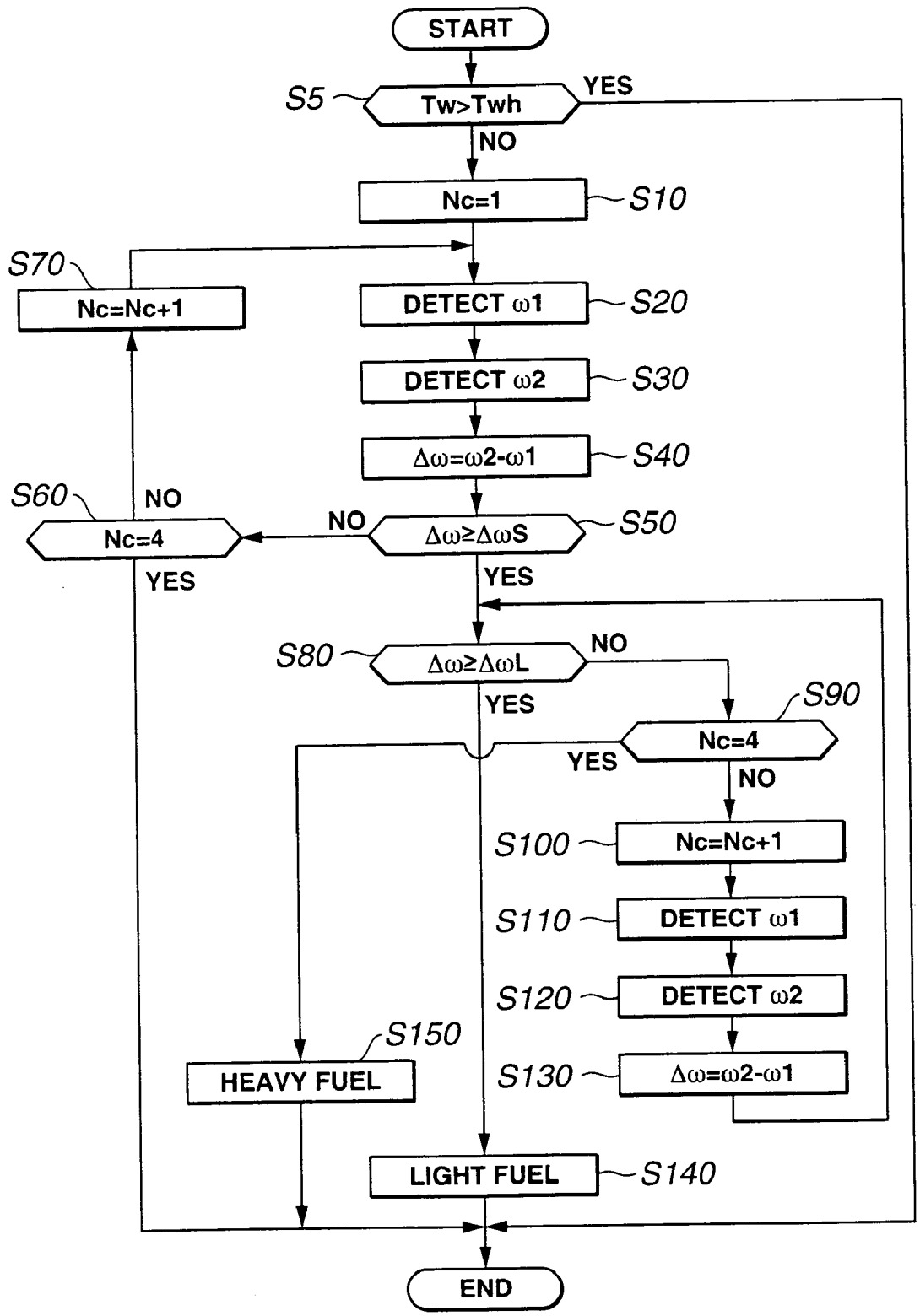
FIG. 8 is a flowchart showing the fuel property determination routine of a third embodiment according to the present invention.

Referring to FIG. 8, there is discussed a third embodiment of the fuel property determination system according to the present invention.

The construction of the third embodiment is basically the same as that of the first embodiment. The third embodiment employs a flowchart for the fuel property determination routine shown in FIG. 8. The flowchart of FIG. 8 is different from that of FIG. 3 in further comprising step S5 before step S10.

Accordingly, at step S5 ECU 11 firstly determines whether or not engine 1 is started under an engine heated condition, that is, whether or not the engine start is a hot restart. More specifically, ECU 11 obtains a cooling water temperature Tw at a time just before the engine start from cooling water temperature sensor 15 and determines whether cooling water temperature Tw is higher than or equal to a predetermined temperature Twh such as 70° C. When cooling water temperature Tw is higher than or equal to predetermined temperature Twh, ECU 11 determines that the present engine start is the hot restart. Therefore, ECU 11 determines that it is impossible to determine the fuel property, and the program is terminated without executing the fuel property determination. When the negative determination is made at step S5, the program proceeds to step S10.

Although the third embodiment has been shown and described such that cooling water temperature Tw is used as an engine temperature representative value, a fuel temperature or oil temperature may be used instead of cooling water temperature Tw. Otherwise, the determination as to the hot restart may be executed by measuring an engine stop period before the engine start (corresponding to a period from a previous engine stop to a present engine start) and by determining whether or not the engine stop period is shorter than or equal to a predetermined period.

With the thus arranged third embodiment according to the present invention, the advantages given by the first embodiment are also obtained. Further, in case of the hot restart of engine 1, the fuel property determination is prohibited to prevent erroneous determination (misjudgment) since the difference of the degrees of changes of the revolution speeds due to the fuel property becomes small in case of the hot restart. Further, the determination as to the hot restart is easily executed on the basis of the cooling water temperature or engine stop period before the engine start.

Figure 9:
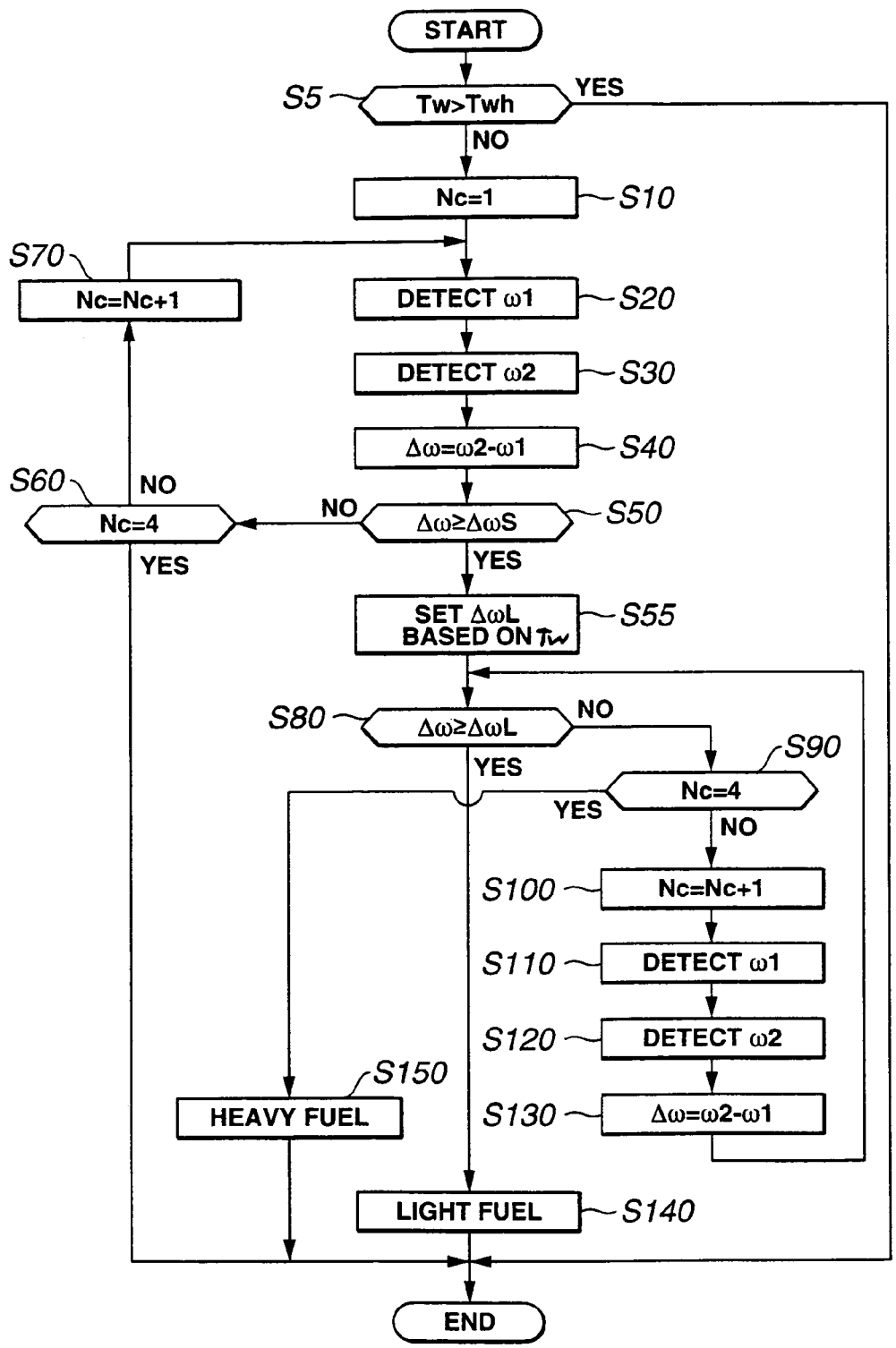
FIG. 9 is a flowchart showing the fuel property determination routine of a fourth embodiment according to the present invention.
Figure 10:
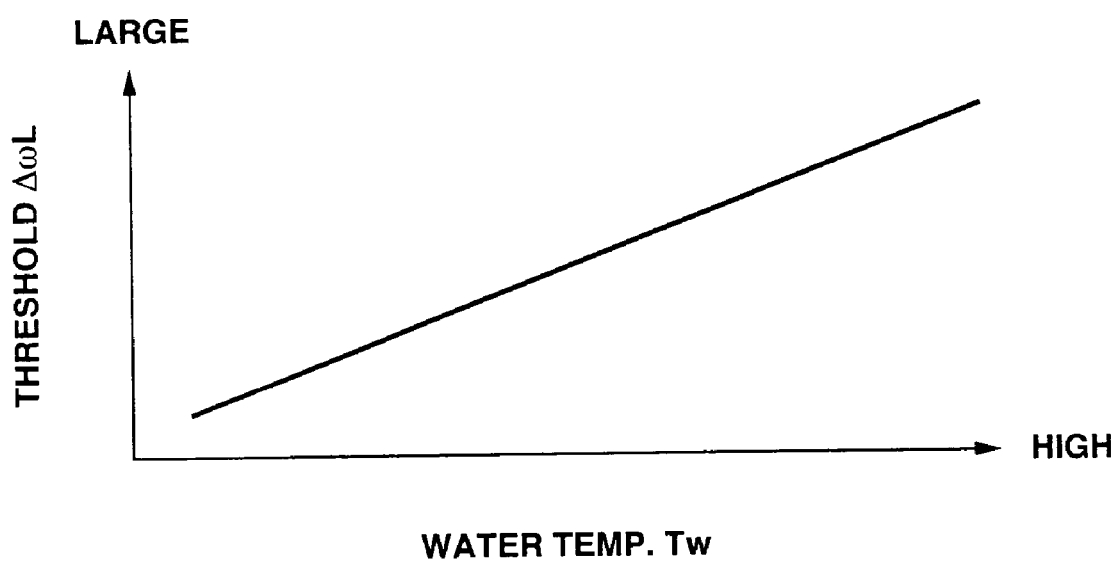
FIG. 10 is a graph showing a relationship between a threshold $\Delta\omega L$ and an engine cooling water temperature Tw.

Referring to FIGS. 9 and 10, there is discussed a fourth embodiment of the fuel property determination system according to the present invention.

The construction of the fourth embodiment is basically the same as that of the first embodiment. The fourth embodiment employs a flowchart for the fuel property determination routine shown in FIG. 9. The flowchart of FIG. 9 is different from that of FIG. 3 in further comprising step S5 before step S10 and step S55 subsequent to the affirmative determination at step S50.

Accordingly, at step S5 ECU 11 firstly determines whether or not engine 1 is started under an engine heated condition, that is, whether or not the engine start is a hot restart. More specifically, ECU 11 obtains a cooling water temperature Tw at a time just before the engine start from cooling water temperature sensor 15 and determines whether cooling water temperature Tw is higher than or equal to a predetermined temperature Twh. When cooling water temperature Tw is higher than or equal to predetermined temperature Twh, ECU 11 determines that the present engine start is the hot restart. Therefore, ECU 11 determines it is impossible to determines the fuel property, and the program proceeds is terminated without executing the fuel property determination. When the negative determination is made at step S5, the program proceeds to step S10.

Although the fourth embodiment has been shown and described such that cooling water temperature Tw is used as an engine temperature representative value, a fuel temperature or oil temperature may be used instead of cooling water temperature Tw. Otherwise, the determination as to the hot restart may be executed by measuring an engine stop period before the engine start (corresponding to a period from a previous engine stop to a present engine start) and by determining whether or not the engine stop period is shorter than or equal to a predetermined period.

Further, at step S55 subsequent to the affirmative determination at step S50, ECU 11 sets the threshold $\Delta\omega L$ according to engine cooling water temperature Tw. More specifically, ECU 11 determines threshold $\Delta\omega L$ from engine cooling water temperature Tw and with reference to a table shown in FIG. 10 which shows a relationship between threshold $\Delta\omega L$ and engine cooling water temperature Tw. Threshold $\Delta\omega L$ has been determined such that threshold $\Delta\omega L$ linearly increases as cooling water temperature increases. In FIG. 10, an applicable range of engine cooling water temperature Tw ranges from $-40°$ C. to $70°$ C., and an applicable range of threshold $\Delta\omega L$ ranges from 30,000 deg/s$^2$ to 100,000 deg/s$^2$ relative to the applicable range of engine cooling water temperature Tw. After the execution of step S55, the program proceeds to step S80.

With the thus arranged fourth embodiment according to the present invention, the advantages given by the first embodiment are also obtained. Further, the variation of the in-cylinder flowing fuel quantity due to the fuel property decreases as the engine temperature at the engine start increases and as the in-cylinder flowing fuel quantity increases. Although this variation generates the misjudgment as to the fuel property, it becomes possible to highly maintain the determination accuracy by changing the threshold $\Delta\omega L$ according to the engine temperature condition such as the cooling water temperature Tw.

Figure 11:
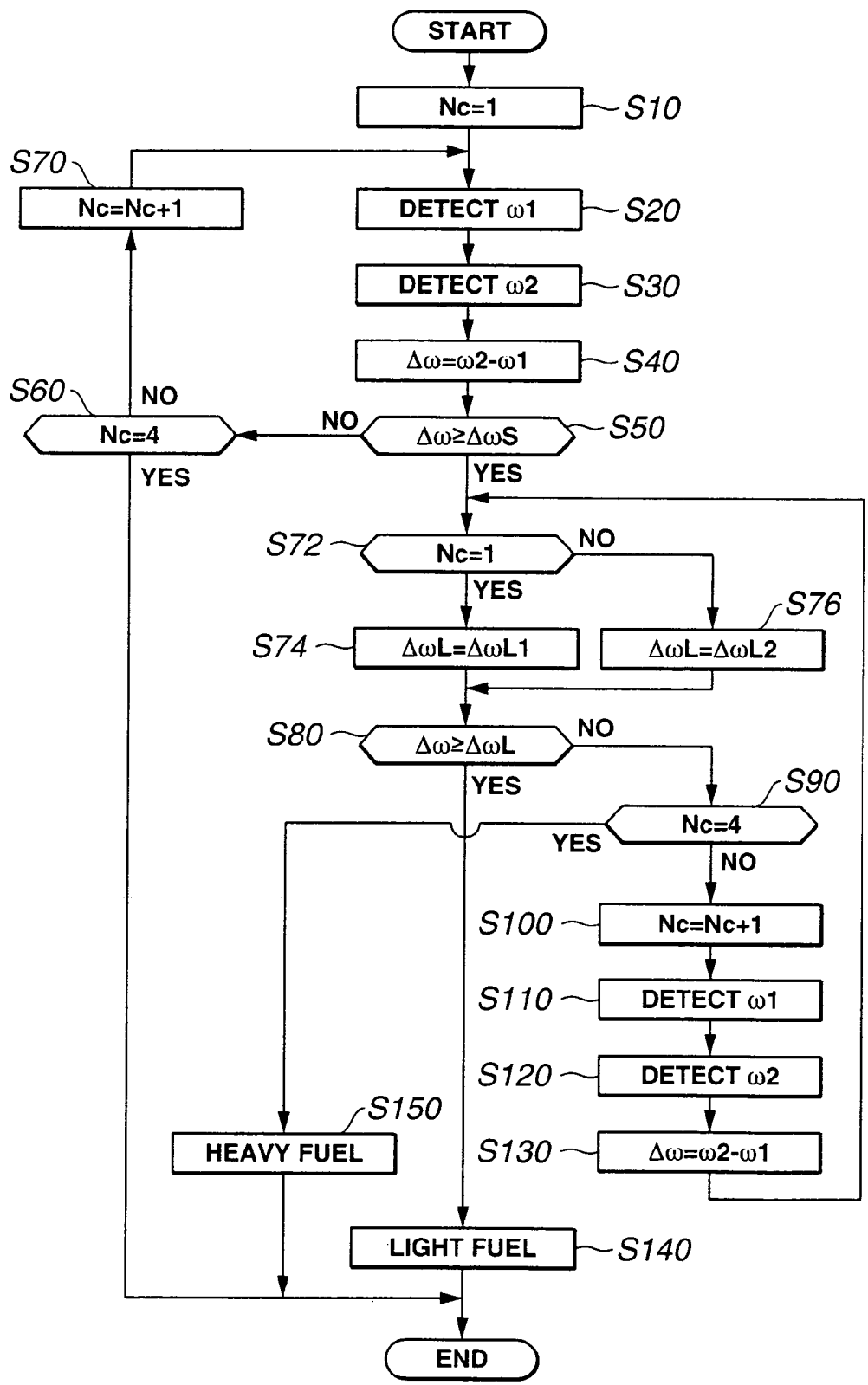
FIG. 11 is a flowchart showing the fuel property determination routine of a fifth embodiment according to the present invention.

Referring to FIGS. 11, 12A and 12B, there is discussed a fifth embodiment of the fuel property determination system according to the present invention.

The construction of the fifth embodiment is basically the same as that of the first embodiment. The fifth embodiment employs a flowchart for the fuel property determination routine shown in FIG. 11. The flowchart of FIG. 11 is different from that of FIG. 3 in further comprising steps S72, S74 and S76 between steps S50 and S80.

At step S72 subsequent to the affirmative determination at step S50, ECU 11 determines whether or not Nc=1, that is, whether or not a cylinder of executing the fuel injection is a first fuel injection cylinder of four-cylinder engine 1. In other words, ECU 11 determines whether or not the cylinder to be determined in the fuel property is a first fuel injection cylinder. When the determination at step S72 is affirmative (Nc=1), the program proceeds to step S74 wherein ECU 11 sets a relatively large value $\Delta\omega L1$ such as 100,000 deg/s$^2$ at threshold $\Delta\omega L$. When the determination at step S72 is negative, that is, the fuel injection cylinder is a second cylinder or later cylinders, the fuel injection is an exhaust stroke fuel injection. Therefore, the program proceeds to step S76 wherein ECU 11 sets a relatively small value $\Delta\omega L2$ such as 80,000 deg/s$^2$ at threshold $\Delta\omega L$ where $\Delta\omega L1 > \Delta\omega L2$. After the execution of step S74 or S76, the program proceeds to step S80.

With the thus arranged fifth embodiment according to the present invention, the advantages given by the first embodiment are also obtained. Further, as shown in FIGS. 5A and 5B, the first fuel injection cylinder is a cylinder wherein the number of times the expansion stroke is three. Even when any fuel (heavy or light fuels) is used, ECU 11 determines the first combustion determination by executing the determination at the first fuel injection cylinder (the number of expansion strokes is three) on the basis of angular acceleration $\Delta\omega = (\omega 2 - \omega 1)/dt$ obtained from compression TDC angular speed $\omega 1$ and expansion stroke maximum angular speed $\omega 2$.

When $\Delta\omega > \Delta\omega L1$ is satisfied simultaneously with the first combustion determination or when $\Delta\omega > \Delta\omega L2$ is satisfied at one of second, third and fourth cylinder (the number of expansion strokes is within a range from 4 to 6), ECU 11 determines that the fuel in use is light fuel. On the other hand, if the fuel in use is heavy fuel, $\Delta\omega > \Delta\omega L1$ is not satisfied simultaneously with the first combustion determination and $\Delta\omega > \Delta\omega L2$ is not satisfied at one of second, third and fourth cylinders (the number of expansion strokes is within a range from 4 to 6). Therefore, ECU 11 determines that the fuel in use is heavy fuel.

The reason for changing threshold $\Delta\omega L$ in the first fuel injection cylinder (intake stroke fuel injection cylinder) and the fuel injection cylinder thereafter is that since the first fuel injection cylinder is an intake stroke cylinder, the in cylinder flowing fuel quantity increases. However, since a time for vaporizing the fuel is short, the difference of the degree of change of the revolution speed due to the difference of the fuel property becomes small.

More specifically, as shown in FIG. 12A, in case of the intake stroke fuel injection, a variation range of the estimated degree $\Delta\omega$ of change of the revolution speed in the situation using heavy fuel and a variation range of the estimated degree $\Delta\omega$ of change of the revolution speed in the situation using light fuel are partly overlapped since the difference therebetween is small. Therefore it is difficult to accurately determine the fuel property of the fuel in use. Accordingly, the threshold of determining the fuel property is set at a relatively large value ΔωL1 which is larger than the variation range of the estimated degree of change of the revolution speed.

That is, if it is erroneously determined that the fuel in use is light fuel even though the fuel in use is actually heavy fuel, the engine operation (drivability) degrades. Therefore in order to prevent such degradation of the engine operation (drivability), the threshold for determining the fuel property is set at the relatively large value ΔωL1. Generally, when it is determined that the fuel in use is heavy fuel even though the actually used fuel is light fuel, the drivability does not degrade although the fuel consumption degrades. That is, when it is difficult to determine the fuel property, the fuel property determination system according to the present invention is basically arranged to determine the fuel in use as heavy fuel. In this fifth embodiment, when the degree Δω of change of the revolution speed becomes higher than threshold ΔωL, it is directly determined that the fuel in use is light fuel. However, when the degree Δω does not become higher than threshold ΔωL, it is not directly determined that the fuel in use is heavy fuel. Therefore, by setting a threshold for the first fuel injection cylinder (intake stroke fuel injection cylinder) at a relatively large value, it becomes possible to prevent the misjudgment of the fuel property and to improve the determination accuracy.

On the other hand, as shown in FIG. 12B, in case of the exhaust stroke fuel injection, a variation range of the estimated degree Δω of change of the revolution speed using heavy fuel and a variation range of the estimated degree Δω of change of the revolution speed in the situation using light fuel are separately positioned since the difference therebetween is large. Therefore it becomes easy to accurately determine the fuel property of the fuel in use. Accordingly, the threshold of determining the fuel property is set at a relatively small value ΔωL2 which is smaller that the value ΔωL1 and which is an intermediate value between the variation range of the estimated degree of change of the revolution speed using heavy fuel and the variation range of the estimated degree Δω of change of the revolution speed using light fuel.

With the thus arranged fifth embodiment according to the present invention, the advantages given by the first embodiment are also obtained. Further, at the cylinder in which the fuel injection is executed during the intake stroke in the first round, such as the first fuel injection cylinder, the difference of the degree of change of the revolution speed due to the fuel property becomes small as compared with a case of the cylinder where the fuel injection is executed during other stroke except for the intake stroke. Therefore, there is a possibility that the erroneous determination as to the fuel property is made. However, by changing the threshold ΔωL according to whether the cylinder to be checked is a cylinder of executing the fuel injection during the intake stroke or cylinder of executing the fuel injection during other stroke (exhaust stroke) except for the intake stroke, the diagnosis accuracy as to the fuel property is improved. More specifically, by setting the threshold ΔωL1 for the degree Δω of change of the revolution speed at the cylinder where the fuel injection is executed during the intake stroke, so as to be greater than the threshold ΔωL2 for the degree Δω of change of the revolution speed at the cylinder where the fuel injection is executed during the other strokes except for the intake stroke, the diagnosis accuracy is improved.

Further, in case of the cylinder where the fuel injection is executed during the intake stroke, when the variation range of the estimated degree Δω of change of the revolution speed in the situation using heavy fuel and the variation range of the estimated degree Δω of change of the revolution speed in the situation using light fuel are partly overlapped, the threshold ΔωL is set at a value greater than the variation range of the estimated degree Δω of change of the revolution speed using heavy fuel. This accurately improves the determination accuracy of the fuel property determination.

Figure 12:
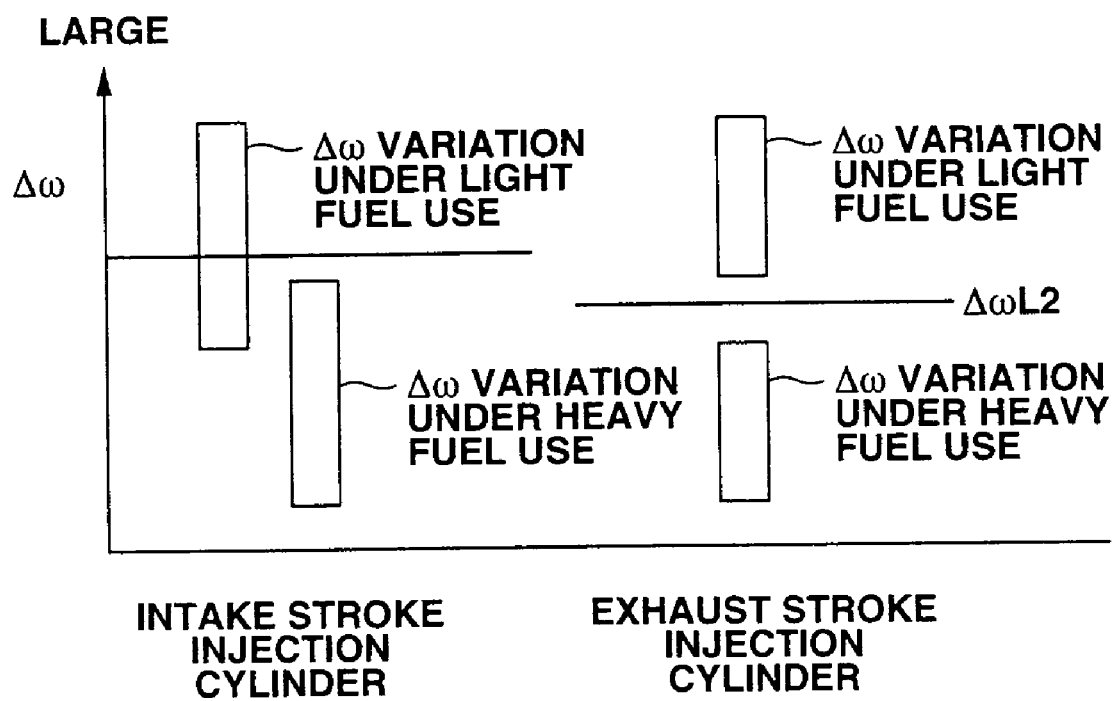
FIGS. 12A and 12B are graphs showing relationships between a deviation range of an angular acceleration and a threshold according to the timing of an engine stroke.

Referring to FIG. 12, there is discussed a sixth embodiment of the fuel property determination system according to the present invention.

Figure 13:
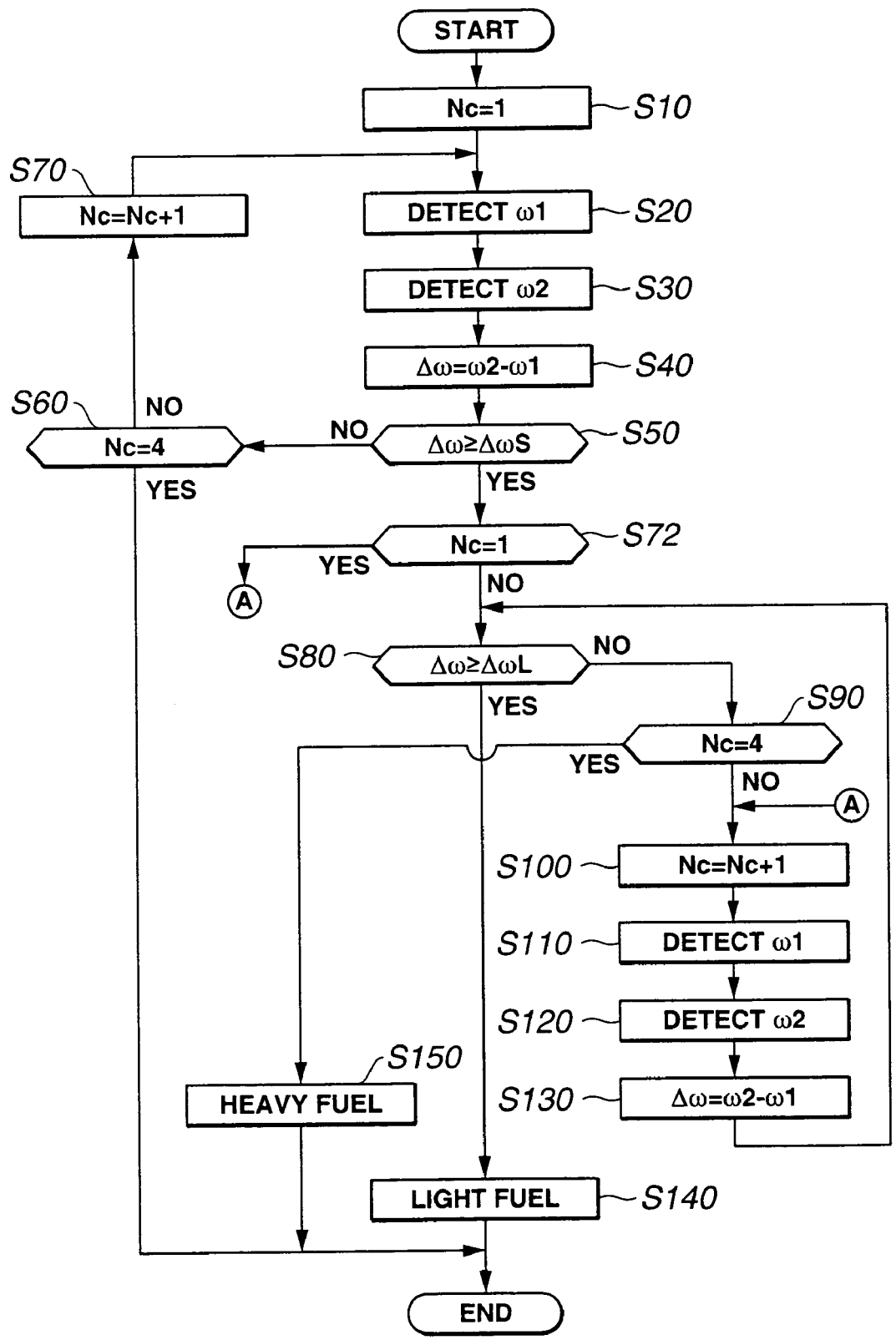
FIG. 13 is a flowchart showing the fuel property determination routine of a sixth embodiment according to the present invention.

The construction of the sixth embodiment is basically the same as that of the first embodiment. The sixth embodiment employs a flowchart for the fuel property determination routine shown in FIG. 13. The flowchart of FIG. 13 is different from that of FIG. 3 in further comprising step S72 subsequent to the affirmative determination at step S50.

At step S72 subsequent to the affirmative determination at step S50, ECU 11 determines whether or not Nc=1, that is, whether or not a cylinder of executing the fuel injection is a first fuel injection cylinder of four-cylinder engine 1. In other words, ECU 11 determines whether or not the cylinder to be determined in the fuel property is a first fuel injection cylinder. When the determination at step S72 is affirmative (Nc=1), the program jumps to step S100 wherein ECU 11 increments Nc by 1 (Nc=NC+1). When the determination at step S72 is negative, that is, the fuel injection cylinder is a second cylinder or later cylinders, the fuel injection is an exhaust stroke fuel injection. Therefore, the program proceeds to step S80 wherein ECU 11 determines whether or not Δω≧ΔωL by comparing angular acceleration Δω indicative of the degree of change of the revolution speed at each cylinder, which is calculated at step S40 with predetermined threshold ΔωL which is larger than ΔωS and corresponds to the value ΔωL2 shown in FIGS. 12A and 12B. When the negative determination is made at step S80, the program proceeds to step S90. When the affirmative determination is made at step S80, the program proceeds to step S140.

At step S90 ECU 11 determines whether or not Nc=4 is satisfied, that is, ECU 11 determines whether or not the fourth cylinder is checked. When the determination at step S90 is negative, the program proceeds to step S100 wherein Nc is incremented by 1 (Nc=Nc+1).

At step S110 subsequent to the execution of step S100, ECU 11 detects compression TDC angular speed ω1 (deg/s). At step S120 ECU detects expansion stroke maximum angular speed ω2 during the expansion stroke. At step S130 ECU 11 calculates angular acceleration Δω=ω2−ω1 from compression TDC angular speed ω1 and expansion stroke maximum angular speed ω2. Thereafter, the program returns to step S80. That is, the processing of step S90 through S130 is repeated until the affirmative determination is made at step S80.

When the affirmative determination is made at step S80 (Δω≧ΔωL), the program proceeds to step S140 wherein ECU 11 determines that the fuel in use is light fuel. Thereafter, the present program is terminated. In contrast to this, when the affirmative determination is made at step S90 (Nc=4) subsequent to the negative determination at step S80, the program proceeds to step S150 wherein ECU 11 determines that the fuel in use is heavy fuel. Thereafter, the present program is terminated.

With the thus arranged sixth embodiment according to the present invention, the advantages given by the fifth embodiment are also obtained. Further, since the sixth embodiment is arranged to prohibit the fuel property determination when the cylinder to be checked is a cylinder in which the fuel injection is executed during the intake stroke of the first round and to execute the fuel property determination when the cylinder to be checked is a cylinder in which the fuel injection is executed during the other stroke except for the intake stroke in the first round, it becomes possible to present the misjudgment due to the decrease of the difference between the degrees of changes of the respective revolution speeds in the respective situations using heavy fuel or light fuel. Further, since the sixth embodiment according to the present invention is arranged such that the fuel property determination is executed on the basis of the degree of change of the revolution speed at the cylinder in which the fuel injection is executed during the other stroke except for the intake stroke, such as the exhaust stroke, it becomes possible to improve the accuracy of the fuel property determination.

This application is based on Japanese Patent Application Nos. 2003-326990, 2003-326991 and 2003-326992 filed on Sep. 19, 2003 in Japan and No. 2003-329357 filed on Sep. 22, 2003 in Japan. The entire contents of these Japanese Patent Applications are incorporated herein by reference.

Although the invention has been described above by reference to a certain embodiment of the invention, the invention is not limited to the embodiment described above. Modifications and variations of the embodiment described above will occur to those skilled in the art, in light of the above teaching. The scope of the invention is defined with reference to the following claims.

What is claimed is:

1. A fuel property determination system for an internal combustion engine, comprising:
a control unit configured to determine a fuel property indicative that fuel in use is heavy or light, on the basis of a degree of change of a revolution speed during a period from an expansion stroke of a first fuel injection cylinder at engine start to an expansion stroke of a final fuel injection cylinder in a first round as to all cylinders of the engine.

2. The fuel property determination system as claimed in claim 1, wherein the degree of change of the revolution speed is calculated on the basis of a difference between an angular speed at an expansion stroke start timing and one of a maximum angular speed during the expansion stroke and a neighborhood value of the maximum angular speed, as to at least one cylinder of the engine.

3. The fuel property determination system as claimed in claim 2, wherein the control unit is further configured to obtain an angular speed near an intermediate position of the expansion stroke as the neighborhood value of the maximum angular speed.

4. The fuel property determination system as claimed in claim 2, wherein the control unit is further configured to obtain an angular speed near a bottom dead center during the expansion stroke as the neighborhood value of the maximum angular speed.

5. The fuel property determination system as claimed in claim 1, wherein the control unit is further configured to determine the fuel property by comparing the degree of change of the revolution speed with a first threshold.

6. The fuel property determination system as claimed in claim 5, wherein the control unit is further configured to calculate the degree of change of the revolution speed as to each cylinder of the engine, and to repeat the comparison between the degree of change of the revolution speed as to each cylinder with the first threshold for all cylinder of the engine.

7. The fuel property determination system as claimed in claim 6, wherein the control unit is further configured to determine that the fuel in use is light when the degree of change of the revolution speed at one of all cylinders within the first round from the first cylinder to the final cylinder of the engine is greater than the. first threshold.

8. The fuel property determination system as claimed in claim 6, wherein the control unit is further configured to determine that the fuel in use is heavy when the degree of change of the revolution speed at each cylinder within the first round from the first cylinder to the final cylinder of the engine is not greater than the first threshold.

9. The fuel property determination system as claimed in claim 1, wherein the control unit is further configured to execute a first combustion determination and to prohibit the fuel property determination based on the degree of change of the revolution speed when the determination that the first combustion was executed is not made within the first round from the first cylinder to the final cylinder.

10. The fuel property determination system as claimed in claim 9, wherein the control unit is further configured to determine that the fuel in use is heavy when the fuel property determination based on the degree of change of the revolution speed was prohibited.

11. The fuel property determination system as claimed in claim 9, wherein the control unit is further configured to execute the first combustion determination on the basis of the comparison between the degree of change of the revolution speed at each cylinder and a second threshold which is smaller than the first threshold for determining the fuel property.

12. The fuel property determination system as claimed in claim 1, wherein the control unit is further configured to prohibit the fuel property determination based on the degree of change of the revolution speed when the engine in a high temperature condition is started.

13. The fuel property determination system as claimed in claim 12, wherein the control unit is further configured to determine that the engine is put in the high temperature condition when an engine cooling water temperature is higher than a predetermined temperature at an engine start timing.

14. The fuel property determination system as claimed in claim 12, wherein the control unit is further configured to determine that the engine is put in the high temperature condition when an engine stop period to the engine start is shorter than a predetermined period.

15. The fuel property determination system as claimed in claim 5, wherein the control unit is further configured to change the first threshold for the fuel property determination according to the engine temperature condition.

16. The fuel property determination system as claimed in claim 15, wherein the control unit is further configured to increase the first threshold for the fuel property as a temperature indicative of the engine temperature condition increases.

17. The fuel property determination system as claimed in claim 15, wherein the control unit is further configured to obtain an engine cooling water temperature as a temperature indicative of the engine temperature condition.

18. The fuel property determination system as claimed in claim 15, wherein the control unit is further configured to prohibit the fuel property determination based on the degree of change of the revolution speed when the engine in a high temperature condition is started.

19. The fuel property determination system as claimed in claim 5, wherein the control unit is further configured to change the first threshold for the fuel property determination according to whether the cylinder to be checked is a cylinder in which the fuel injection is executed during the intake stroke of the first round or a cylinder in which the fuel injection is executed during the other stroke except for the intake stroke in the first round.

20. The fuel property determination system as claimed in claim 19, wherein the control unit is further configured to set the first threshold of the fuel property determination at the cylinder in which the fuel injection is executed during the intake stroke at a value greater than the threshold of the fuel property determination at the cylinder in which the fuel injection is executed during the other stroke except for the intake stroke.

21. The fuel property determination system as claimed in claim 19, wherein the control unit is further configured to set the first threshold relative to the degree of change of the revolution speed at the cylinder in which the intake stroke fuel injection is executed at a value greater than a variation range of the estimated degree $\Delta\omega$ of change of the revolution speed in a situation using heavy fuel when the variation range of the estimated degree $\Delta\omega$ of change of the revolution speed in the situation using heavy fuel and a variation range of the estimated degree $\Delta\omega$ of change of the revolution speed in a situation using light fuel are partly overlapped at the cylinder in which the intake stroke fuel injection is executed.

22. The fuel property determination system as claimed in claim 1, wherein the control unit is further configured to prohibit the fuel property determination when the cylinder to be checked is a cylinder in which the fuel injection is executed during the intake stroke of the first round, and to execute the fuel property determination when the cylinder to be checked is a cylinder in which the fuel injection is executed during the other stroke except for the intake stroke in the first round.

23. The fuel property determination system as claimed in claim 22, wherein the cylinder in which the fuel injection is executed during the intake stroke is a first fuel injection cylinder.

24. The fuel property determination system as claimed in claim 22, wherein the cylinder in which the fuel injection is executed during the other stroke except for the intake stroke is a cylinder in which the fuel injection is executed during the exhaust stroke.

25. A method of determining a fuel property of fuel in use for an internal combustion engine, comprising:
   determining a fuel property indicative that fuel in use is heavy or light, on the basis of a degree of change of a revolution speed during a period from an expansion stroke of a first fuel injection cylinder at engine start to an expansion stroke of a final fuel injection cylinder in a first round as to all cylinders of the engine.

26. A fuel property determination system for an internal combustion engine, comprising:
   a control unit configured to:
   detect a degree of change of a revolution speed during a period comprising a predetermined stroke of a cylinder being involved with a first fuel injection thereto, and
   determine a fuel property being indicative of a specific gravity of fuel in use on the basis of the degree of change of the revolution speed.

27. The fuel property determination system as claimed in claim 26, wherein the predetermined stroke is an expansion stroke.

28. The fuel property determination system as claimed in claim 26, wherein the control unit is configured to determine if the fuel property is heavy or light.

29. An engine system comprising:
   an internal combustion engine; and
   a fuel property determination system comprising a control unit which is configured to determine a fuel property indicative that fuel in use is heavy or light, on the basis of a degree of change of a revolution speed during a period from an expansion stroke of a first fuel injection cylinder at engine start to an expansion stroke of a final fuel injection cylinder in a first round as to all cylinders of the engine.

* * * * *